L. E. CARPENTER AND E. E. ELDREDGE.
CHEESE AND PROCESS FOR STERILIZING THE SAME.
APPLICATION FILED JUNE 21, 1915. RENEWED MAR. 14, 1918.

1,389,577.          Patented Sept. 6, 1921.

WITNESSES:
Fred Roegen
Morris Redlich.

INVENTORS
Linn Eugene Carpenter
Elmer Ellsworth Eldredge
BY
Walton Harrison
their ATTORNEY

UNITED STATES PATENT OFFICE.

LINN EUGENE CARPENTER, OF EAST ORANGE, NEW JERSEY, AND ELMER ELLSWORTH ELDREDGE, OF NEW BERLIN, NEW YORK, ASSIGNORS TO PHENIX CHEESE COMPANY, OF NEW YORK, N. Y., A CORPORATION OF NEW YORK.

CHEESE AND PROCESS FOR STERILIZING THE SAME.

1,389,577.  Specification of Letters Patent.  Patented Sept. 6, 1921.

Application filed June 21, 1915, Serial No. 35,477. Renewed March 14, 1918. Serial No. 222,514.

*To all whom it may concern:*

Be it known that we, LINN EUGENE CARPENTER and ELMER ELLSWORTH ELDREDGE, both citizens of the United States, the former residing at East Orange, in the county of Essex and State of New Jersey, and the latter residing at New Berlin, in the county of Chenango and State of New York, have invented new and useful Improvements in Cheeses and Processes for Sterilizing the Same, of which the following is a specification.

Our invention relates to the sterilization of cheeses, in order to prevent or at least greatly lessen the tendency thereof to decay, and also to improve the cheese by the destruction of disease germs therein contained.

We also seek to improve the flavor and the appearance of the cheese, and also to render its texture homogeneous and uniform.

We have made the discovery that quite a large variety of cheeses differing considerably in kind, may by comparatively simple and inexpensive treatment be given remarkable powers for resisting decay, and that in doing this the cheese is otherwise greatly improved in many ways, principally by ridding it of certain kinds of undesirable bacteria.

We have also made the discovery that the basic material to be operated upon to produce the results desired may be either cheese of a single kind or a mixture of cheeses of different kinds, and that for some purposes a mixture of cheeses is preferable.

Our invention may be practised in several ways differing slightly in detail, and varied to suit cheeses of many different kinds. It is impracticable to describe every possible application which the invention may assume. However, we will describe a specific instance which may be considered as typical.

No particular form of apparatus is essential to our invention, but for the sake of clearness we disclose a few mechanical devices which may be conveniently employed in connection with our process.

Reference is made to the accompanying drawing forming a part of this specification and in which like letters indicate like parts.

Figure 1:
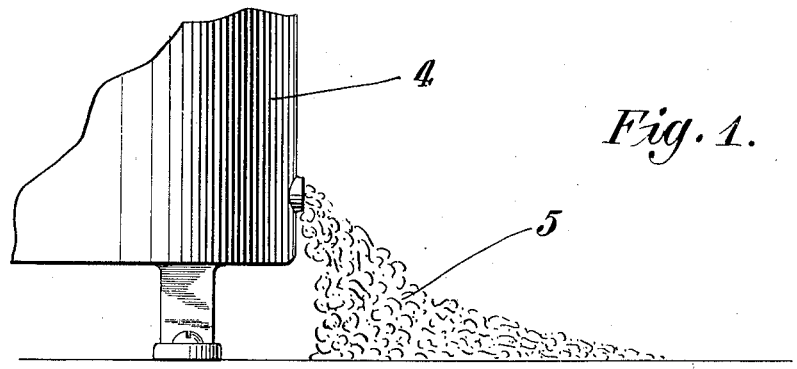
Figure 1 is a fragmentary view of a grinding device, and quantity of cheese being ground thereby.
Figure 2:
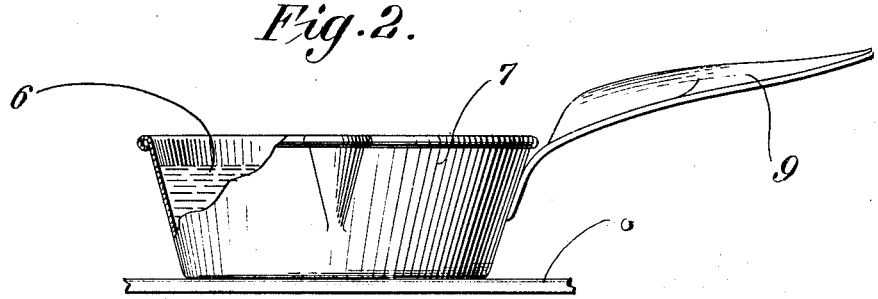
Fig. 2 is a perspective of a heating vessel used for heating the materials, and a spoon for stirring them while thus heated.
Figure 3:
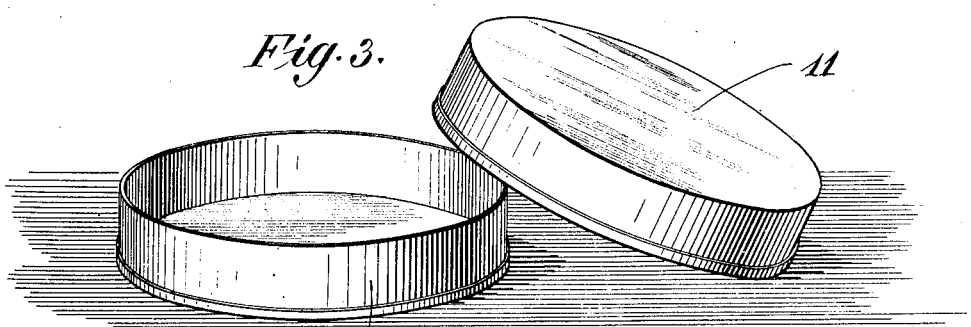
Fig. 3 is a perspective of a box for receiving a quantity of the finished product, this box also serving the purpose of a mold.

We will describe our invention as associated with the cheese known as Camembert. This is a rather soft cheese, often shipped and sold in metallic boxes, and under normal conditions does not keep very long unless maintained at a low temperature. Ordinarily this cheese is covered with a moldy crust, or dirty-looking skin, which is unfit to be eaten, and is stripped off when the cheese is placed upon the dining table.

We take the commercial Camembert cheese just as we find it in the market, and first remove the mold or crust. Next we grind the cheese in a mill. A sausage grinder 4 will answer the purpose. The ground cheese 5 is homogeneous and throughout is smooth to the touch. We now add one-tenth of one per cent. by weight, of sodium citrate in the form of a liquid, and one to five per cent. by weight of cheddar cheese, which should also be ground, as above described with reference to the Camembert.

The entire mass 6 is next placed in a heating vessel 7, provided with a handle 9, and heated in a hot water bath to 170 degrees Fahrenheit, this temperature being steadily maintained for thirty minutes, during which period the mass is stirred constantly by aid of a spoon. No water need be added, the moisture originally contained in the materials, if maintained, being sufficient. The mass 6, being now plastic and soft, is poured into molds, one of which appears at 10, and which may conveniently be the boxes in which the cheese is to be marketed. Each box is provided with a cover 11.

It is preferable, though not essential, that the boxes be made of tin plate or other sheet metal. It is not at all necessary that the boxes be air tight.

It has been ascertained upon actual trial that as the temperature is gradually raised to 150 degrees the fat at first has a tendency to separate from other parts, but between 150 and 170 degrees the fat reunites with the other parts and the mass gradually becomes homogeneous.

The completed product is a cheese having the appearance of the finest Camembert. It is smooth in appearance and to the touch. It is free from all granular particles, and its flavor is practically identical with that of a high grade of Camembert. It differs from Camembert, however, in that it is less pasty, slightly firmer and more resilient. It differs quite radically from Camembert in another particular which is all-important, namely, it is sterilized of decay germs, and of various kinds of disease-bacteria. It may be kept for long periods of time without taking any subsequent precaution to protect it from the air—at least nothing more than keeping it in a box which is not air tight. It may be removed from the box and exposed directly to the air, even in warm weather, and yet it will keep for a relatively long time.

As will be readily understood from the foregoing, we have found that by adding certain ingredients to the cheese at the right stage, and by heating the mass to a moderate temperature for a short time, we produce a pasteurized cheese having improved texture and exceptional keeping qualities—the cheese thus produced being free of disease-bacteria.

Citrates having alkaline bases other than sodium may be substituted for the sodium citrate and in some instances the alkaline salt may be dispensed with altogether.

In this connection we call attention to a fact which may be readily confirmed by casual observation, namely, that when cheese of any kind is heated under ordinary conditions, it is broken up and changed greatly in character. For instance in making Welch rarebit, where the cheese is simply heated in a frying pan to a temperature somewhat higher than the boiling point for water, the resulting mass is resolved into a viscous, adhesive yellowish material floating in clear oil. Again, if a piece of cheese be heated to almost any temperature a little below the boiling point of water, the cheese will become grainy and lose a part of its flavor. We have made the discovery that if the temperature used for heating be carefully adjusted as above described, the cheese may be sterilized or pasteurized, yet without being broken up or having any of its ingredients separated from others. The particular temperature for this purpose varies slightly under different conditions and with different cheeses, as above explained, but allowing for this fact there is a proximate critical temperature at which the greatly-desired result is easily accomplished.

In instances where two kinds of cheese are mixed, as above described, a single common temperature suffices for the mixture. The mixture desired contains a soft cheese and a relatively small proportion of a harder cheese.

The steps such as grinding, adding water and salt and pouring into molds or boxes, though usually desirable in practice, are not in every instance essential.

What is claimed and what is desired to be secured by United States Letters Patent is:—

1. The method herein described, of treating cheese, which consists in grinding the cheese, adding to it a small proportion of an alkaline citrate, heating the mass to a temperature high enough to destroy undesirable bacteria contained in the cheese but not sufficiently high to disintegrate the cheese, and maintaining the temperature until the cheese is sterilized.

2. The method, herein described, of treating cheese, which consists in adding to the cheese a small proportion of an alkaline citrate, heating the mass to a temperature of 165 to 170 degrees Fahrenheit, and maintaining the temperature for approximately thirty minutes.

3. The method, herein described, of treating cheese, which consists in adding thereto a small proportion of sodium citrate, heating the mass to a temperature of 165 to 170 degrees Fahrenheit and maintaining this temperature for thirty minutes.

4. The cheese mass herein described, containing sterilized cheese and sodium citrate.

5. The method herein described of treating cheese which consists in mixing Camembert cheese with one to five per cent. by weight of cheddar cheese, adding one-tenth of one per cent. by weight of sodium citrate and heating the mass for thirty minutes at a temperature of 170 degrees Fahrenheit.

6. As an article of manufacture, a cheese of the Camembert genus, sterilized sufficiently to enable it to keep indefinitely under ordinary climatic temperatures, said cheese having a homogeneous texture.

7. As an article of manufacture, a cheese of the Camembert genus, so far sterilized as to enable it to keep under ordinary climatic temperatures, said cheese being inclosed in a container and having a homogeneous texture.

8. The method herein described of treating a cheese mass containing a preponderance of cheese of the Camembert type, which consists in heating the cheese mass to a temperature of about 170 degrees Fahrenheit and thus melting it, stirring the cheese mass for about thirty minutes while maintaining it at said temperature, and pouring the cheese mass into containers.

9. The method herein described of treating a cheese mass containing a preponderance of cheese of the Camembert genus, which consists in heating the cheese, actively stirring it while thus heated, the temperature being sufficiently high and the heating and stirring being continued for a sufficient length of time to render the cheese permanently keeping, and then inclosing the cheese mass in a container.

In testimony whereof we have hereunto signed our names.

LINN EUGENE CARPENTER.
ELMER ELLSWORTH ELDREDGE.